United States Patent
Matthias et al.

(10) Patent No.: US 9,597,629 B2
(45) Date of Patent: Mar. 21, 2017

(54) METHOD AND DEVICE FOR SEPARATING OFF CARBON DIOXIDE FROM A GAS MIXTURE

(71) Applicant: Airbus DS GmbH, Taufkirchen (DE)

(72) Inventors: Carsten Matthias, Friedrichshafen (DE); Walter Jehle, Horgenzell (DE); Peter Kern, Salem (DE)

(73) Assignee: Airbus DS GmbH, Taufkirchen (DE)

( * ) Notice: Subject to any disclaimer, the term of this patent is extended or adjusted under 35 U.S.C. 154(b) by 0 days.

(21) Appl. No.: 14/806,862

(22) Filed: Jul. 23, 2015

(65) Prior Publication Data

US 2016/0023157 A1    Jan. 28, 2016

(30) Foreign Application Priority Data

Jul. 25, 2014   (EP) .................................. 14178611

(51) Int. Cl.
*B01D 53/04* (2006.01)
*A62B 11/00* (2006.01)
*B01D 53/053* (2006.01)

(52) U.S. Cl.
CPC ............ *B01D 53/053* (2013.01); *A62B 11/00* (2013.01); *B01D 53/0423* (2013.01); *B01D 53/0431* (2013.01); *B01D 53/0462* (2013.01); *B01D 2252/204* (2013.01); *B01D 2253/102* (2013.01); *B01D 2253/20* (2013.01); *B01D 2257/504* (2013.01); *B01D 2258/06* (2013.01);
(Continued)

(58) Field of Classification Search
CPC  A62B 11/00; B01D 53/0423; B01D 53/0431; B01D 53/0462; B01D 53/053; B01D 2252/204; B01D 2253/102; B01D 2253/20; B01D 2257/504; B01D 2258/06; B01D 2259/40013; B01D 2259/40043; B01D 2259/4009; B01D 2259/40096; B01D 2259/4566; B01D 2259/4575; Y02C 10/04; Y02C 10/06; Y02C 10/08
USPC ............ 95/90, 95, 114, 115, 139, 148, 236; 423/228, 230
See application file for complete search history.

(56) References Cited

U.S. PATENT DOCUMENTS

| | | |
|---|---|---|
| 3,469,934 A | 9/1969 | Bocard et al. |
| 3,556,098 A | 1/1971 | Kanwisher et al. |

(Continued)

FOREIGN PATENT DOCUMENTS

| | | |
|---|---|---|
| AU | 2011257650 B2 | 12/2011 |
| DE | 20 2008 016 034 U1 | 2/2009 |

(Continued)

OTHER PUBLICATIONS

Office Action issued Nov. 25, 2015 in the corresponding AU application No. 2015204377.

(Continued)

*Primary Examiner* — Frank Lawrence
(74) *Attorney, Agent, or Firm* — Posz Law Group, PLC

(57) ABSTRACT

A method for separating off carbon dioxide from a gas mixture, in particular from breathing air, with a life-sustaining device, wherein in a first method step the gas mixture is fed to an adsorption and/or absorption unit under at least one first pressure, and in a second method step a gas mixture is conveyed out of the adsorption and/or absorption unit under at least one second pressure that is higher than the first pressure.

21 Claims, 6 Drawing Sheets

Figure 1:
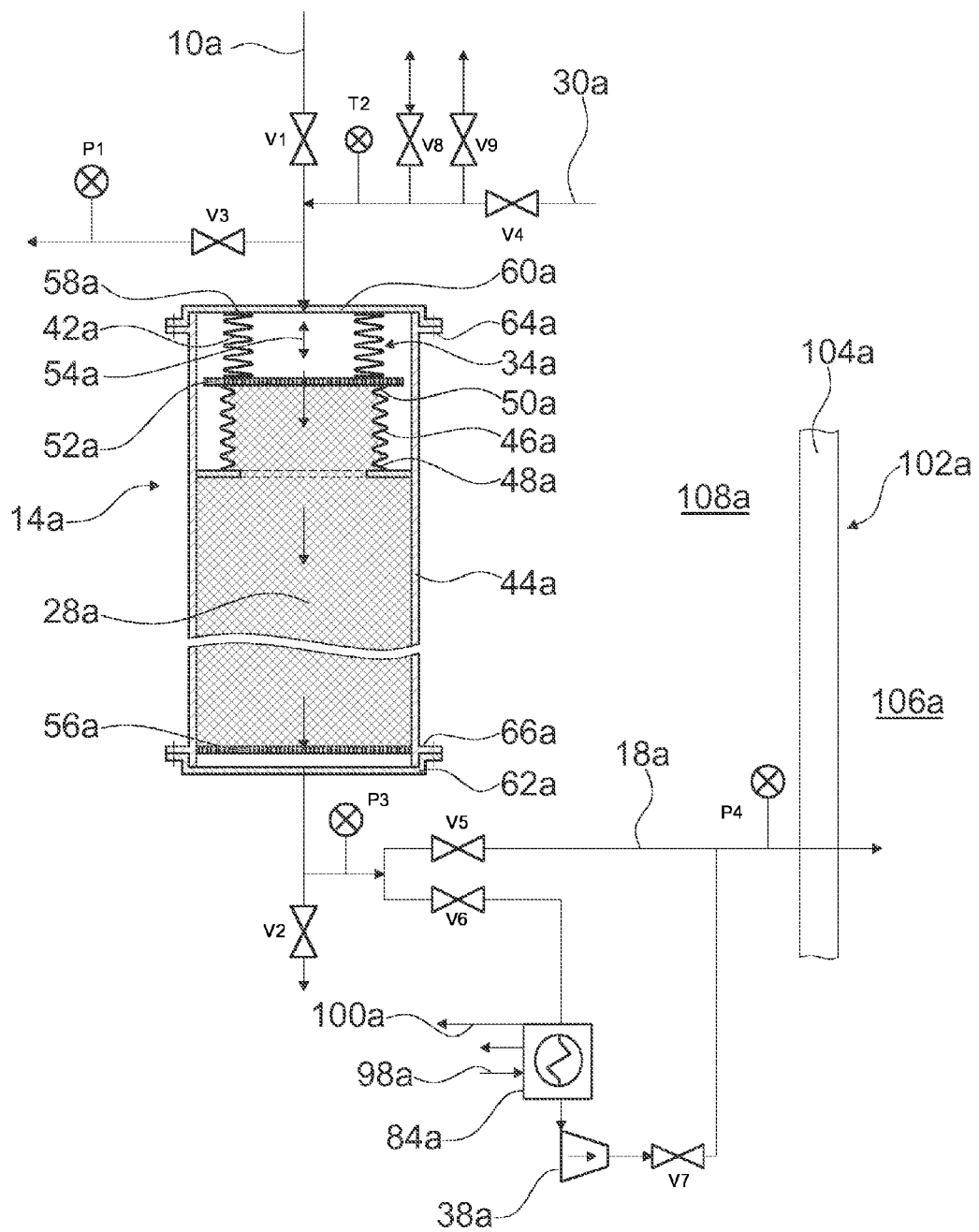

(52) U.S. Cl.
CPC ........... *B01D 2259/4009* (2013.01); *B01D 2259/40013* (2013.01); *B01D 2259/40043* (2013.01); *B01D 2259/40096* (2013.01); *B01D 2259/4566* (2013.01); *B01D 2259/4575* (2013.01); *Y02C 10/04* (2013.01); *Y02C 10/06* (2013.01); *Y02C 10/08* (2013.01)

(56) References Cited

U.S. PATENT DOCUMENTS

| | | | |
|---|---|---|---|
| 3,690,040 | A | 9/1972 | Halfon |
| 3,729,902 | A | 5/1973 | Ventriglio et al. |
| 4,822,383 | A | 4/1989 | Brose et al. |
| 5,061,455 | A * | 10/1991 | Brose ............ B01D 53/04 423/228 |
| 5,968,234 | A | 10/1999 | Midgett, II et al. |
| 5,972,077 | A | 10/1999 | Judkins et al. |
| 6,364,938 | B1 | 4/2002 | Birbara et al. |
| 8,128,735 | B1 * | 3/2012 | Siriwardane ....... B01D 53/0462 95/115 |
| 2007/0089605 | A1 | 4/2007 | Lampinen |
| 2008/0202339 | A1 * | 8/2008 | Nalette ............ B01D 53/0454 95/120 |
| 2010/0263534 | A1 | 10/2010 | Chuang |
| 2012/0004092 | A1 | 1/2012 | Raatschen et al. |
| 2012/0160099 | A1 | 6/2012 | Shoji et al. |
| 2012/0222553 | A1 | 9/2012 | Kamakoti et al. |

FOREIGN PATENT DOCUMENTS

| | | |
|---|---|---|
| EP | 0 068 525 A1 | 1/1983 |
| EP | 2 397 212 A1 | 12/2011 |
| GB | 2013101 A | 8/1979 |
| JP | H02-187153 A | 7/1990 |
| JP | 0411920 A | 1/1992 |

OTHER PUBLICATIONS

Search Report and Written Opinion dated Dec. 1, 2014 issued in corresponding EP patent application No. 14 17 861.1 (and partial English translation).

* cited by examiner

METHOD AND DEVICE FOR SEPARATING OFF CARBON DIOXIDE FROM A GAS MIXTURE

CROSS REFERENCE TO RELATED APPLICATION

This application is based on and incorporates herein by reference European Patent Application No. 14178611.1 filed on Jul. 25, 2014.

STATE OF THE ART

From EP 2 397 212 A1 a method for separating off carbon dioxide from a gas mixture is already known. Herein thermal energy utilized for a regeneration of an adsorber or absorber is generated by combusting a carbon dioxide containing energy carrier with oxygen.

The objective of the invention is, in particular, to provide a method for separating off carbon dioxide at a high pressure during a regeneration of an adsorber or absorber with a high efficiency rate. The objective is achieved, according to the invention, by the features of patent claim 1, while advantageous implementations and further developments of the invention may be gathered from the dependent claims and from one additional independent claim.

ADVANTAGES OF THE INVENTION

A method is proposed for separating off carbon dioxide from a gas mixture, in particular from breathing air, with a life-sustaining device, in particular in a closed habitat and particularly preferably in a submarine vessel, wherein in a first method step the gas mixture is fed to an adsorption and/or absorption unit under at least one first pressure and in a second method step a gas mixture is conveyed out of the adsorption and/or absorption unit under at least one second pressure that is higher than the first pressure. The terms "first method step" and "second method step" are in particular not meant exclude that further method steps may be carried out between the so-called first method step and the so-called second method step. A "closed habitat" is to mean a habitat into which, at least in respective operating states, in particular no air can be fed from its surroundings, which is in particular the case with habitats of submarine vessels or with outer space habitats.

By way of the pressure change proposed, which may also be termed a pressure swing method, a particularly high efficiency rate respectively a particularly efficient method is achievable, in particular if in the first method step the gas mixture is fed to the adsorption and/or absorption unit at least substantially at ambient pressure, which is, in particular, preferably at least substantially the same as a cabin pressure of the habitat, namely in particular of a submarine vessel or of an outer space cabin. A "cabin pressure" is herein to be understood, in particular, as a pressure in a cabin in which persons may stay in the submarine vessel or in the outer space cabin principally without breathing support and without pressure suits. Preferentially the ambient pressure of the adsorption and/or absorption unit corresponds at least substantially to an absolute pressure of 101.325 $kPa_{abs}$. Herein the term "at least substantially" is to mean a difference of less than 30%, advantageously less than 20% and particularly preferably less than 10%. The second pressure is preferably at least twice as great, particularly preferably at least four times as great as the first pressure. Preferentially the second pressure is greater than 3 $bar_{abs}$, particularly preferably greater than 5 $bar_{abs}$ and very preferably greater than 10 $bar_{abs}$.

By the implementation according to the invention, a process is achievable which is in particular energetically favorable, as a pressure increase can be effected at least partially, preferably largely or particularly preferably even entirely in a liquid phase (high pressures being realized by means of water and applying a high-pressure pump). A simple controlling of the processes is achievable, in particular via absolute-pressure sensor and at low air loss. A low carbon dioxide refeed during an air refeed is achievable by an advantageous gas separation. Cost-effective adsorption and/or absorption units with simple geometries and few components may be used. It can be achieved that off-separated hydrated carbon dioxide is present at increased pressure and low temperatures, on account of which the carbon dioxide can be dehydrated very effectively before being fed to a compressor for subsequent densification. Moreover, compressor stages and hence construction costs, construction space and weight can be saved by achieving an already pre-densified carbon dioxide.

During a submarine mission at low diving depth, a noise signature of the submarine vessel can be improved, namely in particular due to use of a compressor for densifying carbon dioxide being avoidable.

Preferably herein at least one pressure container is used as an adsorption and/or absorption unit, i.e. the adsorption and/or absorption unit that is used comprises at least one pressure container, as a result of which advantageously an overpressure can be established inside said pressure container. A "pressure container" is herein to be understood as a container that is deliberately provided and in particular designed in such a way that inside the pressure container an overpressure, in particular a pressure greater than 5 $bar_{abs}$ and particularly preferably greater than 10 $bar_{abs}$, can be established, and the container bears this internal pressure.

It is further proposed that the adsorption and/or absorption unit is heated for the purpose of a pressure increase inside the adsorption and/or absorption unit. By heating a pressure increase is effectively achievable and in particular a carbon dioxide desorption can also be favored.

In another implementation of the invention it is proposed that at least one adsorption and/or absorption unit is heated by means of hot vapor. Herein a hot vapor source of a submarine vessel may preferably be made use of and/or a pump and an evaporator may be used for generating hot vapor.

Furthermore, it is proposed that at least one adsorption and/or absorption unit is heated electrically, as a result of which desired temperatures may easily be set in a deliberate fashion. Especially advantageously an electric heating may be combined with another type of heating, e.g. advantageously a heating via hot vapor and/or a heating by means of a heat carrier fluid that heats the adsorption and/or absorption container by being conveyed alongside walls of the adsorption and/or absorption container, following the principle of a heat exchanger.

In a further implementation it is proposed that, for the purpose of a pressure increase inside the adsorption and/or absorption unit, a fluid is introduced into the adsorption and/or absorption unit, preferentially into an inner space of the pressure container of the adsorption and/or absorption unit, in which the adsorption and/or absorption material is also arranged. Thus in particular advantageously high pressures are achievable inside the adsorption and/or absorption unit. Herein various fluids are conceivable that are deemed expedient by a person having ordinary skill in the art. Especially advantageously, however, hot vapor, hot water and/or carbon dioxide is fed to the adsorption and/or absorption unit.

The efficiency rate can be further improved if in the first method step the gas mixture is fed to the adsorption and/or absorption unit under at least one first temperature and in the second method step the gas mixture that is to be conveyed off is conveyed out of the adsorption and/or absorption unit under at least one second temperature that is higher than the first temperature. Preferably the first temperature is between 5° C. and 50° C., particularly preferably between 10° C. and 40° C. and very especially preferentially between 15° C. and 30° C. The second temperature is preferably higher than 70° C., particularly preferably higher than 80° C. and very especially preferentially higher than 90° C.

If a gas, in particular carbon dioxide, is refed to the adsorption and/or absorption unit for increasing a concentration in the adsorption and/or absorption unit, in particular the adsorption and/or absorption material, advantageously high pressures can be achieved, and in particular carbon dioxide can be conveyed out of the adsorption and/or absorption unit at high pressures. A "gas" is to be understood, in this context, as a gas mixture or as a pure gas. Especially advantageously a multi-stage increase of a concentration may be effected, as a result of which the pressure can be increased even further. Herein carbon dioxide is refed in at least two stages, i.e. in a first stage from a first adsorption and/or absorption unit to a second adsorption and/or absorption unit, and in at least one second stage from the second adsorption and/or absorption unit to a third adsorption and/or absorption unit.

If carbon dioxide is conveyed out of at least one adsorption and/or absorption unit without subsequent densification and without use of a compressor directly, preferentially directly out of a submarine vessel, the efficiency rate is further increasable. This may be realized in particular in case of small diving depths of the submarine vessel.

Moreover it is proposed that in at least one adsorption and/or absorption unit at least one volume compensator is used, which is provided for ensuring a compaction of an adsorption and/or absorption material of the adsorption and/or absorption unit. An expansion of the adsorption and/or absorption material may be rendered possible while still ensuring a compaction as well as a dimensional stability of the adsorption and/or absorption material, in particular of an absorber resin and/or and adsorber resin, in particular in a hydrogen atmosphere. The volume compensator may herein comprise different elements that are deemed expedient by a person having ordinary skill in the art, e.g. a compressible gas volume, elastically deformable spring elements, retaining elements, etc. However, especially advantageously, the volume compensator comprises at least one mechanical spring element. Herein a "mechanical spring element" is to be understood, in particular, as a spring with an elastic non-gaseous material. Principally different springs are conceivable that are deemed expedient by the person having ordinary skill in the art, e.g. tension springs etc., while particularly preferably a compression spring is made use of, in particular a helical compression spring, preferentially a metallic helical compression spring. Preferably the volume compensator may comprise at least one concertina-type gaiter to render possible an advantageously movably supported limiting wall for the adsorption and/or absorption material. The volume compensator further comprises at least one perforated plate, in particular a perforated metal sheet and/or a metallic fabric, which preferably serves as a limiting wall for the adsorption and/or absorption material. "Provided" is to mean, in particular, specifically designed and/or equipped. By an object being provided for a certain function is to be understood that the object fulfills and/or carries out said certain function in at least one application state and/or operating state.

In another implementation of the invention it is proposed that the gas mixture is introduced into the adsorption and/or absorption unit in a first principal flow direction and is conveyed through an adsorption and/or absorption material arranged in the adsorption and/or absorption unit in a second principal flow direction that significantly differs from the first principal flow direction, thus ensuring advantageously low pressure loss. Preferably the adsorption and/or absorption unit comprises at least one flow deflecting element, which is provided to deflect the gas mixture that has been introduced in the first direction into a second principal flow direction that substantially differs from the first principal flow direction through the adsorption and/or absorption material arranged in the adsorption and/or absorption unit. By a "second principal flow direction that substantially differs from the first principal flow direction" is to be understood, in particular, that the principal flow directions include an angle greater than 30°, preferably greater than 45° and very preferably of at least substantially 90°. A "principal flow direction" is to be understood, in this context, in particular as a direction of a net flow, in particular a direction of a median mass transport in a flow.

Furthermore, it is possible to save energy, thus increasing the efficiency rate, by heat energy being transferred from an adsorption and/or absorption unit to at least one further adsorption and/or absorption unit and/or by pressure energy being transferred from an adsorption and/or absorption unit to at least one further adsorption and/or absorption unit. Herein preferentially a plurality of adsorption and/or absorption units, in particular adsorption tubes and/or absorption tubes, are interconnected with each other to form a plant. Respective adsorption and/or absorption units go time-delayed, preferably continuously alternating, first through an adsorption and/or absorption phase, which is directly followed by a regeneration phase, which allows a pressure swing integration and an at least partial heat integration to rendered possible in the plant.

Principally different adsorber and/or absorber materials are conceivable that are deemed expedient by a person having ordinary skill in the art, e.g. in particular liquid or gaseous adsorber and/or absorber materials. Especially advantageously, however, at least one solid-matter adsorber and/or solid-matter absorber is made use of, particularly preferably an absorber resin and/or an adsorber resin. An amine, preferably a solid-matter amine, is particularly suitable. The absorption and/or adsorption material preferentially comprises a selectivity greater than 100, particularly preferably greater than 150 and very particularly preferably greater than 200 at standard conditions, i.e. at a temperature of 25° C. and a pressure of 1 $bar_{abs}$. Herein a "selectivity" is to mean a load ratio, in particular a load ratio of carbon dioxide and air. The absorption and/or adsorption material is preferably utilized as a filling. By a "filling" is to be understood, in this context, in particular that the material is present in a granular and/or piecewise mix, in particular in a pourable form. By the solid-matter amine advantageously low regeneration temperatures are achievable. Furthermore a long service life is achievable. However, as an alternative to an amine, molecular sieves, e.g. made of activated carbon, are principally also conceivable.

It is additionally proposed that a heat carrier fluid is pumped into a heat cycle for heating at least one adsorption and/or absorption unit. The heat carrier fluid is herein advantageously conveyed outside around adsorption and/or absorption elements, preferably outside to adsorption and/or absorption tubes, and is pumped in the heat cycle. Herein advantageously a plurality of adsorption and/or absorption tubes can be integrated in a tube bundle heat exchanger, in which the heat carrier fluid flows through a shell space of the adsorption and/or absorption tubes respectively flows around shells of the adsorption and/or absorption tubes. By a respective implementation the efficiency rate may be further optimized.

It is also proposed that a recovery of air from at least one adsorption and/or absorption unit is carried out by means of at least one vacuum pump, preferably at the start of a regeneration phase, as a result of which very easy recovery of air and low air loss are achievable. Furthermore, a corresponding recovery of air by means of a vacuum pump may be easily established as concerns measurement and regulation techniques.

In a further implementation of the invention it is proposed that pre-densified carbon dioxide, after being conveyed out of at least one adsorption and/or absorption unit, is dehydrated and then subsequently densified. Preferably herein a condensing heat exchanger is used, i.e. a heat exchanger wherein heat is discharged to the surroundings in particular via condensation. Due to the gas dehydration in the heat exchanger carried out under increased pressure, advantageously a low residual water quantity in the gas is achievable prior to the following subsequent densification in a compressor. On account of this, in particular cost-effective compressors with a long service life can be used. Dehydration preferably takes place under increased pressure, preferably under a pressure greater than 4 $bar_{abs}$.

It is moreover proposed that the carbon dioxide is dissolved in a liquid, in particular in water, via at least one pressure water purger, as a result of which using a compressor can be avoided and hence energy may be saved.

Furthermore, energy may be saved if a residual gas pressure in at least one adsorption and/or absorption unit, in particular at the end of a regeneration, is discharged into a liquid tank, in particular into a water tank, in at least one method step. The liquid in the liquid tank can advantageously be pre-heated, thus allowing an advantageous heat integration to be achieved. In this case, carbon dioxide can then be advantageously be dissolved in the liquid, in particular in water. Following this, the liquid can be advantageously used in later regenerations as a feed water for an evaporator. In a vaporization of the liquid, the carbon dioxide dissolved in the liquid is released, such that a carbon dioxide/vapor mixture is introduced into the adsorption and/or absorption unit, as a result of which an advantageously high pressure is achievable in the adsorption and/or absorption unit.

Further a device is proposed for carrying out a method according to the invention, with at least one first adsorption and/or absorption unit.

The adsorption and/or absorption unit preferably comprises at least one pressure container, in which adsorption and/or absorption material of the adsorption and/or adsorption unit is arranged, on account of which an advantageous overpressure may be advantageously established in the adsorption and/or absorption unit. An energy input for a densification after the adsorption and/or absorption unit can be at least reduced or even completely avoided. The pressure container may herein be implemented by a variety of components that are deemed expedient by a person having ordinary skill in the art, e.g. angular pressure containers, round pressure containers, etc. Especially advantageously, however, the pressure container is implemented at least partially by a tube, namely preferably at least partially by a cylindrical pressure tube.

DRAWINGS

Further advantages may be gathered from the following description of the drawings. In the drawings exemplary embodiments of the invention are shown. The drawings, the description and the claims contain a plurality of features in combination. The person having ordinary skill in the art will purposefully also consider the features separately and will find further expedient combinations.

Figure 2:
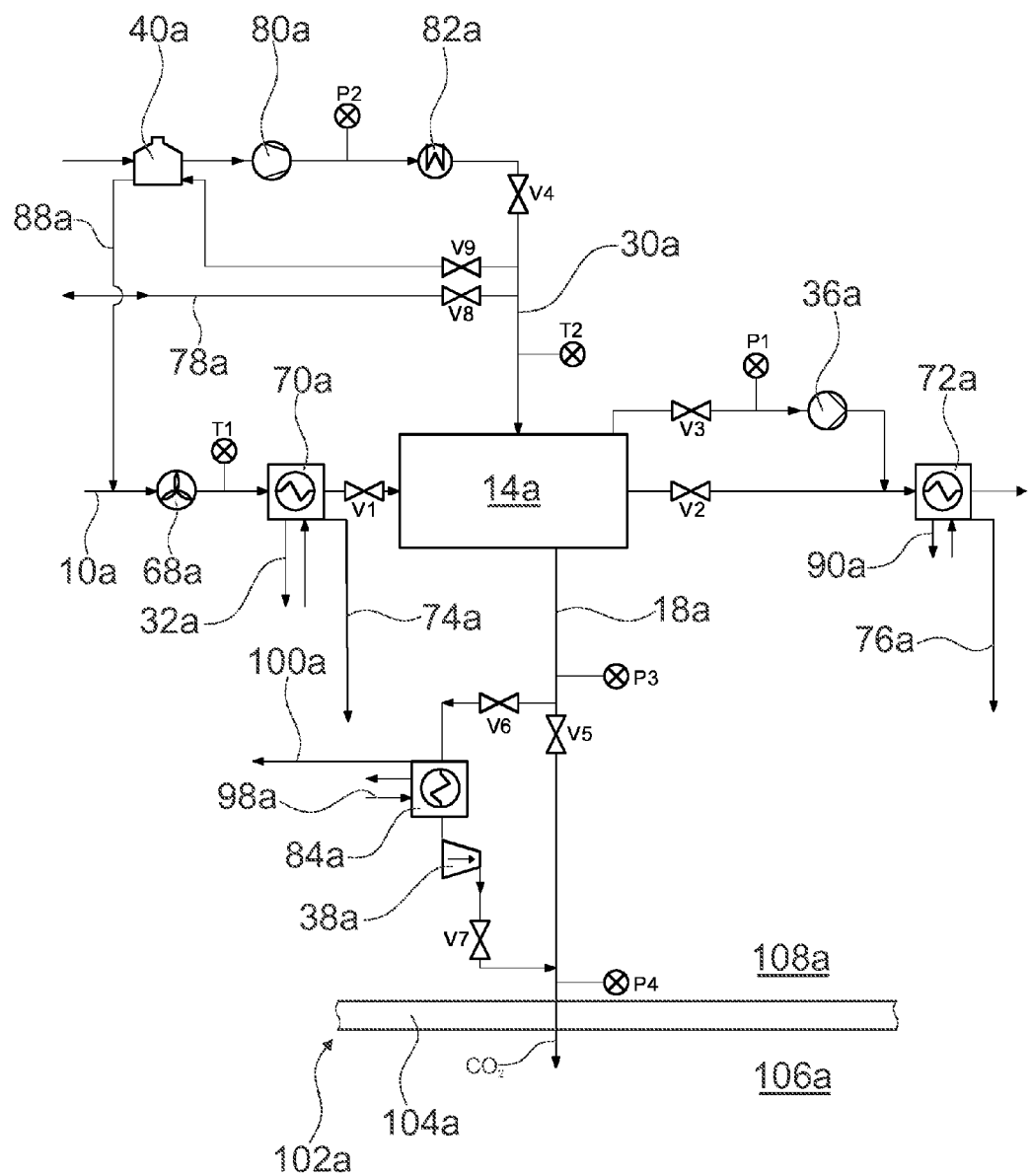
Figure 3:
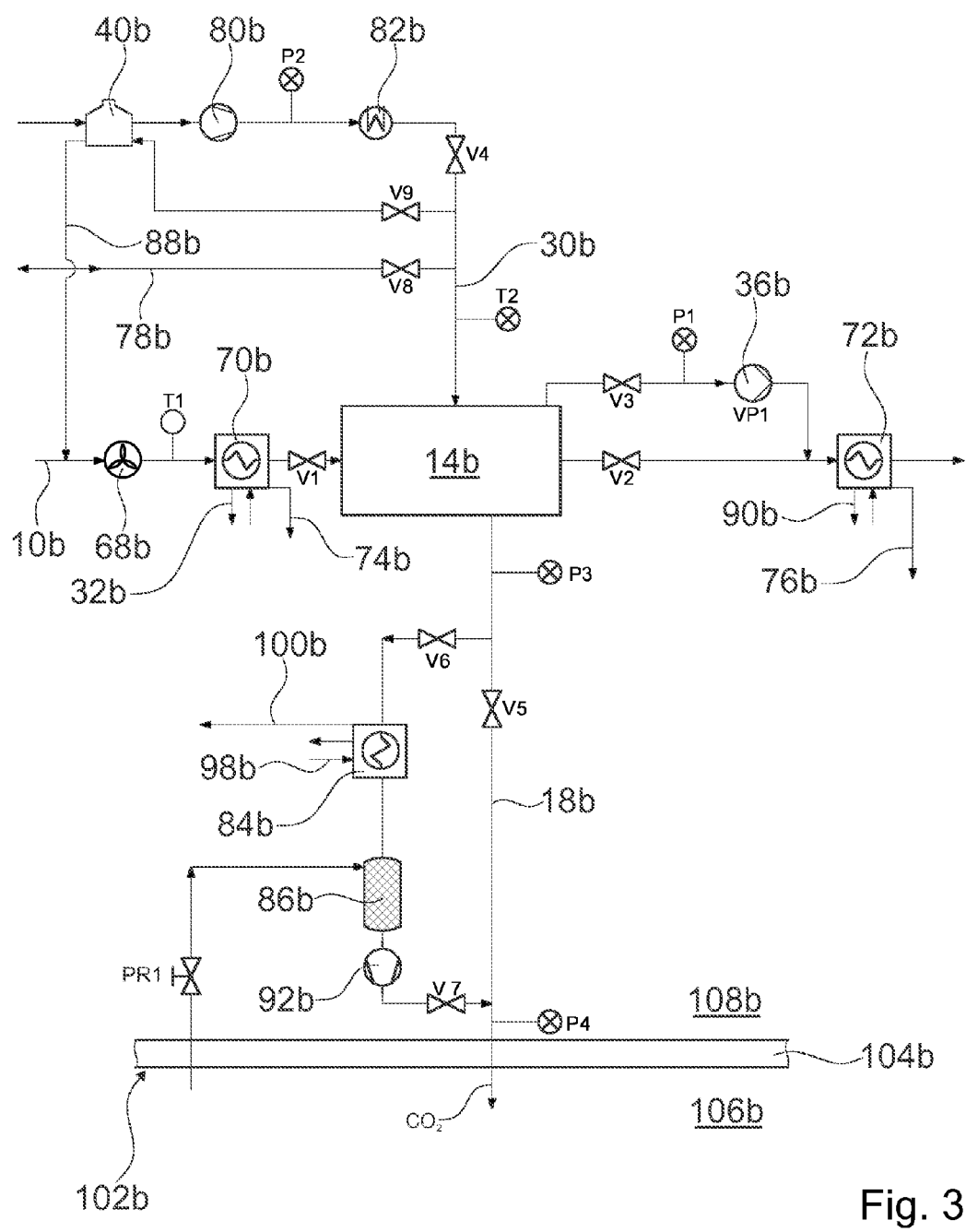
Figure 4:
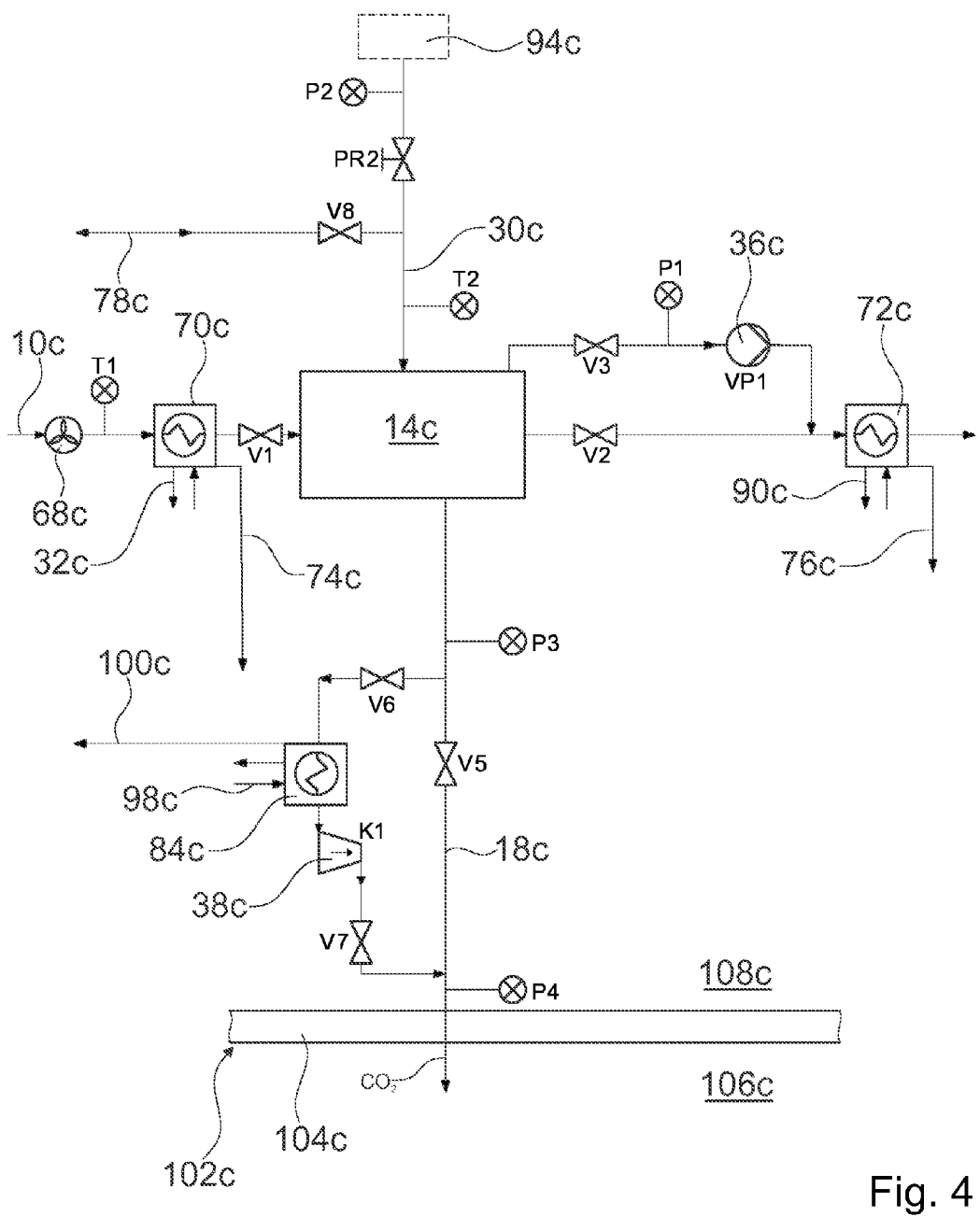
Figure 5:
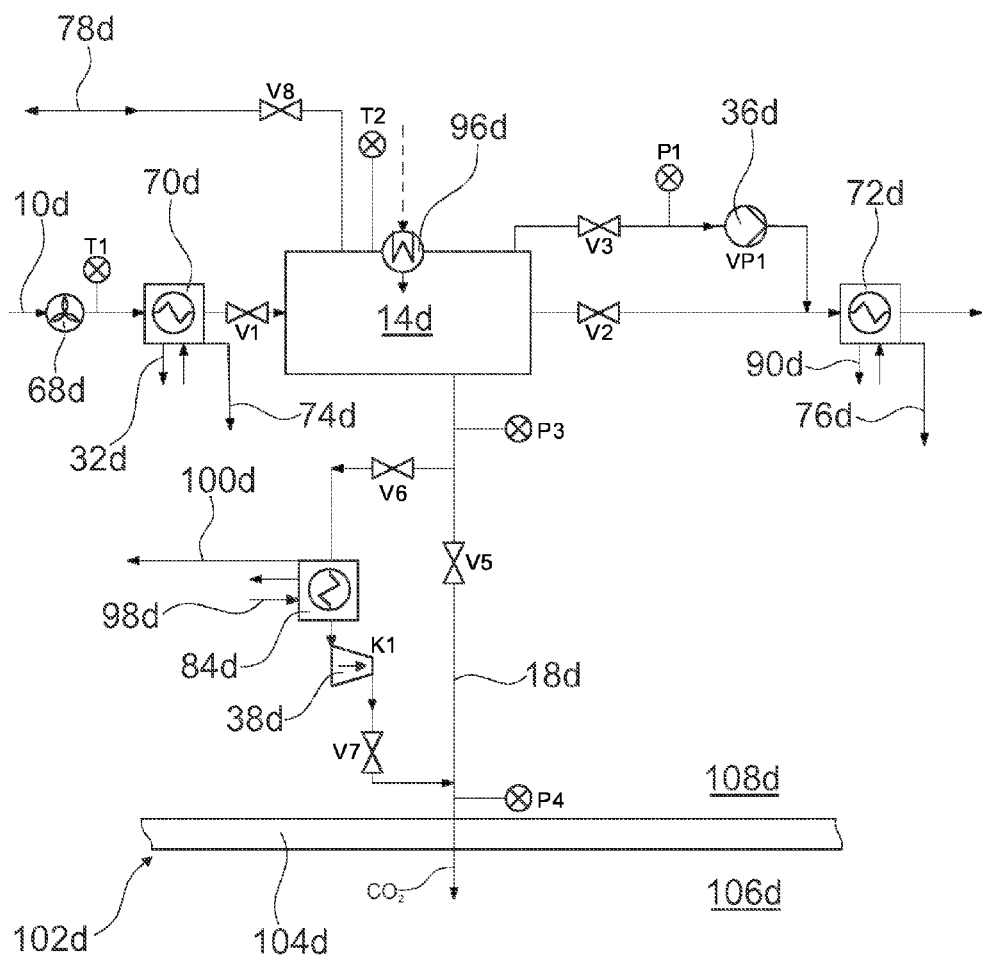
Figure 6:
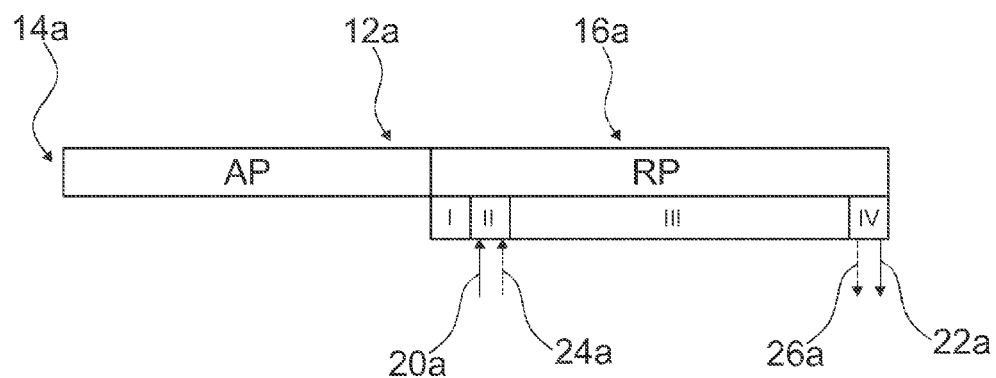
Figure 7:
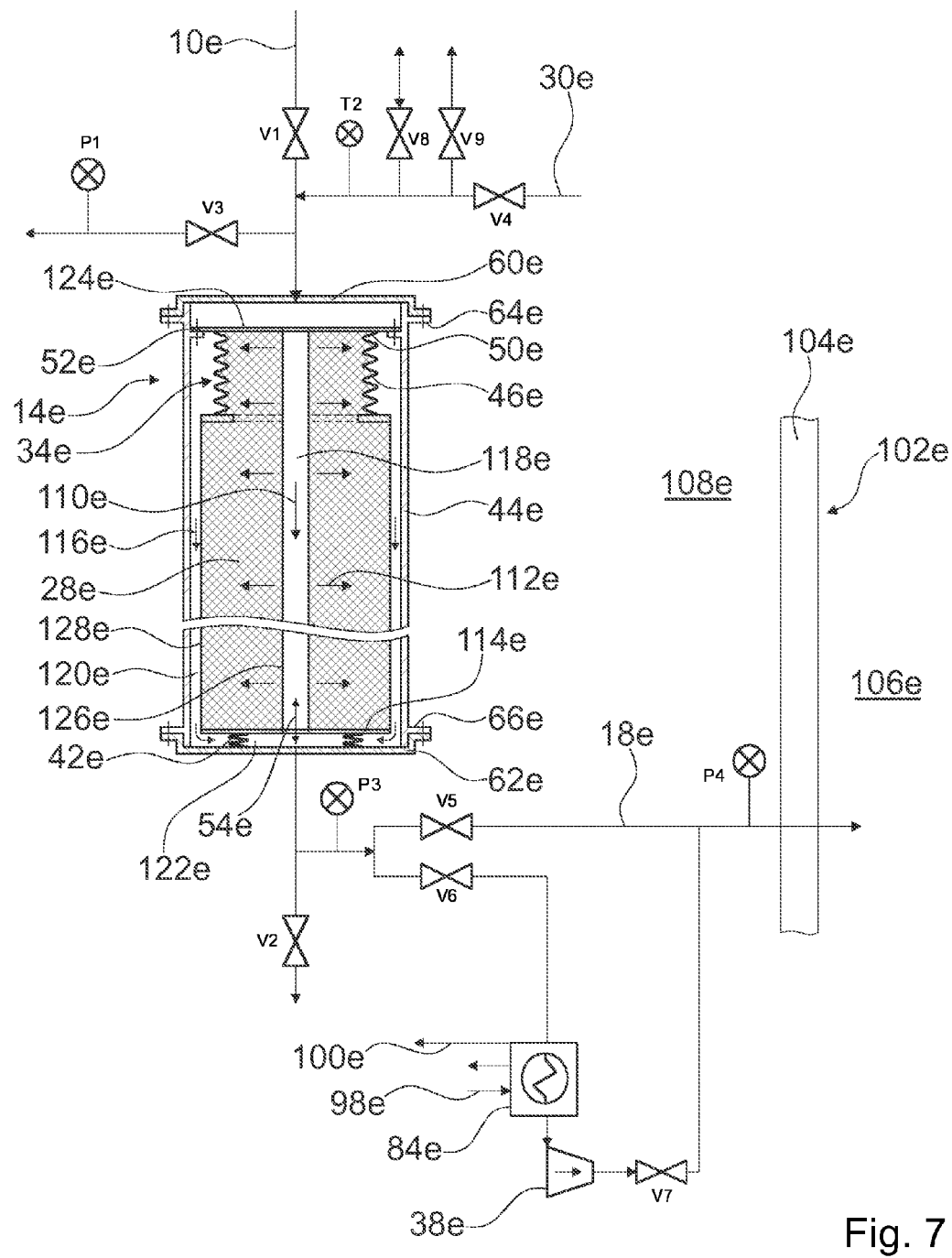

It is shown in:

FIG. 1 a section of a device according to the invention with a schematically depicted absorption tube, FIG. 2 a schematic presentation of the device according to the invention with a carbon dioxide compressor, FIG. 3 a schematic presentation of an alternative device according to the invention with a pressure water purger, FIG. 4 a schematic presentation of an alternative device according to the invention with a hot vapor source, FIG. 5 a schematic presentation of an alternative device according to the invention without use of vapor, FIG. 6 a schematically depicted process flow with respective method steps during an operating cycle, and FIG. 7 a section of a device according to the invention with a schematically depicted alternative absorption tube.

DESCRIPTION OF THE EXEMPLARY EMBODIMENTS

FIG. 1 shows a section of a device according to the invention, in this case a life-sustaining device, for carrying out a method according to the invention. The device comprises several absorption units 14a that are interconnected with each other for separating off carbon dioxide from a gas mixture 10a, in this case from breathing air in a closed habitat 108a of a submarine vessel 102a, the exterior wall 104a of which is indicated (FIGS. 1, 2 and 6). The respective absorption units 14a go time-delayed, steadily alternating, through a first method step 12a, namely an absorption phase (AP), and after this a second method step 16a, namely a regeneration phase (RP) (FIG. 6). For a simplified illustration, only one of the absorption units 14a is shown, the other absorption units, which are not shown in detail, being implemented structurally identical to the absorption unit 14a shown. The absorption unit 14a comprises a pressure container 44a, namely a cylindrical absorption tube, in which absorber material of the absorption unit 14a is arranged. The pressure container 44a is used as the absorption unit 14a. In the pressure container 44a a solid-matter absorber 28a is used, which means that the absorber material is implemented by a solid material, namely a resin that is present as a filling. The resin is a solid-amine resin.

The absorption unit 14a comprises a volume compensator 34a, which is provided and is used for ensuring a compaction of the absorption material of the absorption unit 14a. The volume compensator 34a comprises a concertina-type gaiter 46a arranged in the absorption tube. The concertina-type gaiter 46a is firmly connected, via its first end 48a, to the absorption tube and is connected, via its second end 50a, to a perforated metal sheet 52a of the volume compensator 34a that is movably arranged inside the absorption tube. The concertina-type gaiter 46*a* is made of polytetrafluoroethylene. Principally, however, other materials that are deemed expedient by a person having ordinary skill in the art are also conceivable. The volume compensator 34*a* further comprises mechanical spring elements 42*a*, which charge the perforated metal sheet 52*a* with a load toward the absorber material. Herein the spring elements 42*a* are supported, with their first ends 58*a*, at a lid 60*a* of the absorption unit 14*a*, by means of which the absorption tube is closed at its first end. Between the lid 60*a* and the absorption tube a sealing (not shown in detail) is arranged, namely a double sealing. At its second end the absorption tube is closed by means of a bottom 62*a*. The lid 60*a* and the bottom 62*a* are respectively screwed with an exterior flange 64*a*, 66*a* that is fastened to the absorption tube. The spring elements 42*a* are embodied by metallic helical compression springs. In a direction facing away from the movably arranged perforated metal sheet 52*a*, the absorber material is supported at a second perforated metal sheet 56*a* that is fastened in the absorption tube. The perforated metal sheets 52*a*, 56*a* are each reinforced by an integrated metal fabric. By means of the volume compensator 34*a*, a volume change 54*a* respectively an expansion of the absorber material in the absorption tube can be ensured, while still an advantageous compactness of the absorber material, respectively the filling, can be ensured. By means of the concertina-type gaiter 46*a*, a friction between the perforated metal sheet 52*a* and an interior side of the absorption tube is advantageously avoidable.

In the first method step 12*a*, i.e. in the absorption phase, the gas mixture 10*a*, i.e. the breathing air, is fed to the absorption unit 14*a* by means of a fan 68*a* at a first pressure and a first temperature and is conveyed through the absorption tube and through the absorption material, i.e. the filling (FIGS. 1 and 2). The first pressure herein corresponds to an ambient pressure of the absorption unit 14*a*. Furthermore, the first temperature corresponds to an ambient temperature of the absorption unit 14*a*.

For controlling the device, the device comprises a plurality of valves V1 to V9, the valves V1 and V2 being opened for introducing breathing air by means of the fan 68*a*. The remaining valves V3 to V9 are closed. In the absorption phase, carbon dioxide is bonded to the absorption material and the hydrated absorption material is dehydrated and cooled after a previously executed regeneration phase (RP). The device comprises a condensing heat exchanger 70*a*, which is connected upstream of the absorption unit 14*a*. At the end of the absorption phase (AP) cold air supplied by the condensing heat exchanger 70*a* can then be conveyed through the absorption material, respectively the filling, to the purpose of achieving a highest possible carbon dioxide load of the absorption material at the end of the absorption, at a low temperature. During the absorption phase (AP) the temperature is regulated and monitored via a temperature sensor T1. Air that is present at the outlet of the absorption unit 14*a* is cooled and dehydrated via a further condensing heat exchanger 72*a*, which is connected downstream of the absorption unit 14*a*. The device further comprises another condensing heat exchanger 84*a*, the function of which will be described later on. The condensing heat exchangers 70*a*, 72*a*, 84*a* of the device are connected to cooling cycles of the submarine vessel 102*a* and are supplied with cooling water 32*a*, 90*a*, 98*a*. Condensed water 74*a*, 76*a*, 100*a* is conveyed out of the condensing heat exchangers 70*a*, 72*a*, 84*a*. Preferably all condensing heat exchangers 70*a*, 72*a*, 84*a* of the device are connected to cooling cycles of the submarine vessel 102*a*. The cooling cycle allocated to the heat exchanger 70*a* can herein also be operated in a bypass.

The regeneration phase (RP) of the absorption material following the absorption phase (AP) comprises the following process steps (FIG. 6):

I. Closing the valves V1 and V2 and opening the valve V3:

First of all air present in a hollow-space volume of the filling is suctioned off by means of a vacuum pump 36*a* and is refed into the habitat 108*a* of the submarine vessel 102*a*. An air recovery thus realized is herein temporally regulated by way of measuring an absolute pressure in the absorption tube via an absolute-pressure sensor P1.

II. Feed-in of vapor and of carbon dioxide:

Following this a mixture 78*a* of vapor and carbon dioxide is introduced into the evacuated, cold absorption unit 14*a* at temperatures of maximally 110° C. The mixture 78*a* is fed to the absorption unit 14*a* from a second absorption unit that is not shown in detail. To this purpose, first the valve V3 is closed and then the valve V8 is opened via which the mixture 78*a* is fed to the absorption unit 14*a*. Herein the second absorption unit that is not shown in detail has previously finished a regeneration phase, as a result of which in said absorption unit that is not shown in detail there is a high pressure of preferably more than 5 $bar_{abs}$ and a high temperature of preferably more than 90° C., thus achieving a pressure swing integration and a partial heat integration, resulting in heat energy 20*a* and pressure energy 24*a* being transferred from the absorption unit that is not shown in detail to the absorption unit 14*a* (FIGS. 2 and 6). The carbon dioxide is refed from the absorption unit that is not shown in detail to the absorption unit 14*a* for the purpose of increasing concentration. A hot vapor feed-in temperature is monitored via a temperature sensor T2. By carbon dioxide absorption at the cold absorption material in the absorption unit 14*a*, additional absorption heat is released, which is utilized for additionally heating the absorption unit 14*a*.

III. Feed-in of hot vapor:

Following the above, hot vapor 30*a*, i.e. over-heated vapor, is fed into the absorption unit 14*a*, namely into an inner space of the pressure container 44*a*, in which also the absorption material is located, by means of a high-pressure pump 80*a*, which is supplied with water from a liquid tank 40*a*, and of a high-pressure evaporator 82*a*, as a result of which the absorption unit 14*a* and the absorption material contained therein are further heated and the pressure is further increased. Herein the valve V4 is open and the remaining valves V1 to V3 and V5 to V9 are closed. A hot vapor feed-in temperature is herein regulated via a temperature sensor T2 in connection with a pressure sensor P2, with the high-pressure pump 80*a* and with the high-pressure evaporator 82*a*. Due to a vapor front introduced and further heating up of the absorption material, carbon dioxide desorbs, and firstly a carbon dioxide/water vapor gas pressure is effected in the absorption unit 14*a*, namely in the absorption tube, which is now at approximately 1.5 $bar_{abs}$. In the following, at a vapor feed-in temperature of maximally 110° C., if a pressure of 1.5 $bar_{abs}$ is exceeded, no vapor but merely hot water is introduced into the absorption tube. By the hot water introduced, the absorption tube is still further heated, the free gas volume in the absorption tube is reduced and the carbon dioxide is pushed/displaced out of the absorption material. Herein the carbon dioxide cannot significantly dissolve in the water at the high temperatures, which are in particular higher than 90° C. On account of the water, the absorption material, namely the resin, will additionally expand more, which results in a volume expansion of the absorption material respectively the filling, as a result of which the free gas volume is further reduced and the pressure in the absorption tube is further increased. Moreover, with increasing water intake of the resin the carbon dioxide bonding capacity of the resin diminishes. The pressure increase during this phase can be influenced by regulating a mass flow of the hot water.

If a certain pressure in the absorption unit 14a is exceeded, depending on a diving depth of the submarine vessel 102a either the hydrated carbon dioxide is pressed overboard, i.e. through the exterior wall 104a of the submarine vessel 102a, directly without a compressor and thus without a subsequent densification (valve V5 is opened), or the hydrated and already partially compressed carbon dioxide (valve 6 open, valve 5 closed) is first effectively dehydrated by means of a condensing heat exchanger 84a at a low temperature of in particular less than 20° C. and at a high pressure of in particular more than 5 $bar_{abs}$, and is then subsequently densified by a compact compressor 38a and is conveyed off via the open valves V6 and V7 (valve V5 being closed). A carbon dioxide gas flow is herein regulated via pressure sensors P3 and P4, as well as via the valve setting of the valves V5 to V7. In the second method step 16a, namely at the end of the regeneration phase (RP), a gas mixture 18a is hence conveyed out of the absorption unit 14a at a second pressure that is higher than the first pressure, at which the gas mixture 10a was introduced in the first method step 12a, in the absorption phase (AP). Moreover, in the second method step 16a the gas mixture 18a is conveyed off at a second temperature that is higher than the first temperature, at which the gas mixture 10a was fed to the absorption unit 14a in the first method step 12a.

It is principally also conceivable that the compressor 38a can be dispensed with completely.

IV. Pressure swing integration and partial heat integration:

At the end of the regeneration phase (RP) a hot gas phase, which is still in the absorption tube and is under pressure, is passed on, to the largest possible extent, to a further absorption unit not shown in detail via the valve V8 (pressure swing integration and partial heat integration), the absorption unit not shown in detail being cold and evacuated, at the beginning of its respective regeneration phase. Heat energy 22a and pressure energy 26a are transferred from the absorption unit 14a to the further absorption unit that is not shown in detail (FIGS. 2 and 6).

A gas phase in the absorption tube, which is under a residual pressure, can then be discharged into the liquid tank 40a, respectively can be conveyed through the liquid tank 40a (valve V9 open and valve V8 closed), wherein the water is heated and carbon dioxide dissolves in the water. Residual carbon dioxide gas is then introduced into an air feed-in in front of the fan 68a via a line 88a. Pre-heated, carbon dioxide saturated water from the liquid tank 40a is then used as feed water for further regenerations.

It is also possible that, during a starting phase of the device, no carbon dioxide is conveyed out of the absorption unit 14a directly via the valves V5 and V6 in the regeneration phase, but all the desorbed gas is fed into a further absorption unit, which is not shown in detail. In this case, by way of a corresponding carbon dioxide re-feed via the valve V8, an increased pressure can be established during regeneration in the absorption unit not shown in detail, in particular due to the fact that a larger quantity of carbon dioxide can desorb during the regeneration phase. This carbon dioxide re-feed can be repeatedly executed in the device, in particular during the starting phase, thus achieving a gradational increase of carbon dioxide concentration in the absorption units respectively in their absorption tubes. At the end of the starting phase a partial gas flow of the carbon dioxide located in the device is then conveyed off at a maximally achievable pressure while a high pressure is still maintained in the steady operation of the device during the regenerations. In this in particular a pressure maximum is to be observed, as the carbon dioxide liquefies if this pressure maximum is exceeded.

In FIGS. 3 to 5 and 7, four more exemplary embodiments of the invention are shown. The following descriptions are substantially limited to differences between the exemplary embodiments, wherein the description of the other exemplary embodiments, in particular of FIGS. 1, 2 and 6, may be referred to regarding components, features and functions that remain the same. For distinguishing the exemplary embodiments, the letter a in the reference numerals of the exemplary embodiment of FIGS. 1, 2 and 6 has been substituted by the letters b to e in FIGS. 3 to 5 and 7. Regarding components having the same denomination, in particular regarding components having the same reference numeral, principally the drawings and/or the description of the other exemplary embodiments, in particular of FIGS. 1, 2 and 6 may be referred to.

In the exemplary embodiment in FIG. 3, hydrated and already partially compressed carbon dioxide is provided to be firstly cooled by means of a condensing heat exchanger 84b and is dissolved in water in a following pressure water purging by means of a pressure water purger 86b at a low temperature of preferably less than 20° C. and a high pressure of preferably more than 8 $bar_{abs}$, the carbon dioxide water solution being discharged out of the submarine vessel 102b by means of a high-pressure pump 92b. Herein water is fed to the pressure water purger 86b at a high pressure from a submarine environment 106a via a pressure regulator PR1. A primary water pressure of the pressure water purger 86b is herein regulated by means of the pressure regulator PR1 in connection with pressure sensors P3 and P4. A carbon dioxide gas flow is also regulated via the pressure sensors P3 and P4 and via a valve setting of the valves V5 to V7. Using the pressure water purger 86b is advantageously possible in particular if in absorption units 14b used a high primary carbon dioxide gas pressure of in particular more than 10 $bar_{abs}$ has already been achieved and a purging tower can be implemented accordingly in a compact fashion by means of pressure water purgers 86b.

The exemplary embodiment in FIG. 4 provides a hot vapor source 94c of a submarine vessel 102c being utilized, a vapor feed-in temperature and a vapor flow into an absorption unit 14c being regulated via a pressure regulator PR2 and via sensors P2 and T2.

In the exemplary embodiment in FIG. 5 an absorption unit 14d is electrically heated by a heating unit 96d. As an alternative, the absorption unit 14d could also be heated during a regeneration phase via an external heat carrier fluid. The absorption unit 14d is herein heated to such an extent that an increased carbon dioxide gas pressure is established in an absorption tube of the absorption unit 14d. An absorption material arranged in the absorption unit 14d herein remains substantially dry in the absorption tube of the absorption unit 14d. However, a condensing heat exchanger 84d is provided for allowing a water vapor, which is bonded during an absorption phase and desorbs in the regeneration phase, to condensate upstream of a compressor 38d. In case a heat carrier fluid is used, an improved heat integration in an interconnection of a plurality of absorption tubes is achievable by using a heat cycle. Herein a plurality of absorption tubes may be integrated into a tube bundle heat exchanger, the heat carrier fluid being then conveyed shell-side around the absorption tubes.

FIG. 7 shows an exemplary embodiment, in which a gas mixture 10e is introduced into an absorption unit 14e in a first principal flow direction 110e and is conveyed through an absorption material arranged in the absorption unit 14e in a second principal flow direction 112e, which substantially differs from the first principal flow direction 110e. The principal flow directions 110e, 112e are oriented perpendicularly to each other. To this purpose the absorption unit 14e comprises a flow deflecting element 114e, which is provided to deflect the gas mixture 10e, which has been introduced in the first direction 110e, through the absorption material arranged in the absorption unit 14e into the second direction 112e, which substantially differs from the first direction 110e. The absorption unit 14e comprises an annular basket 116e with an axial channel 118e. The annular basket 116e is arranged in a cylindrical pressure container 44e of the absorption unit 14e. The annular basket 116e, in which the absorption material is arranged, is implemented, in a region facing towards the first principal flow direction 110e, partially by a concertina-type gaiter 46e that forms part of a volume compensator 34e of the absorption unit 14e. The annular basket 116e is firmly connected at the free end 50e of the concertina-type gaiter 46e to the pressure container 44e via an annular plate 124e, and is charged with pressure at its end opposite to the free end of the concertina-type gaiter 46e by spring elements 42e of the volume compensator 34e in such a way that the absorption material is always compressed but can expand in case of swelling. The annular basket 116e as well as its axial channel 118e are closed, at the end oriented in the principal flow direction 110e, in which the gas mixture 10e is introduced into the absorption unit 14e, by a plate forming the flow deflecting element 114e.

The gas mixture 10e is introduced into the absorption unit 14e via the axial channel 118e of the annular basket 116e in an axial direction and is then deflected due to the flow deflecting element 114e and is conveyed through the absorption material in a radial direction of the absorption unit 14e. There is an annular gap 120e radially outside the annular basket 116e, between the annular basket 116e and the pressure container 44e, through which a gas mixture resulting from an absorption process is axially conveyed into a chamber 122e at the end of the absorption unit 14e and is then conveyed out of the absorption unit 14e. To this purpose the annular basket 116e comprises an interior wall 126e limiting the axial channel 118e and an exterior wall 128e limiting the annular basket 116e to the outside, both of which are implemented such that they are permeable for the gas mixture 10e. Herein the exterior wall 128e is implemented partially by the concertina-type gaiter 46e, which is also permeable for the gas mixture 10e. Due to the gas flow guidance chosen in the exemplary embodiment of the FIG. 7, pressure losses in the absorption unit 14e during the absorption phase (AP) may be reduced to a minimum.

REFERENCE NUMERALS 10 gas mixture
12 method step
14 adsorption and/or absorption unit
16 method step
18 gas mixture
20 heat energy
22 heat energy
24 pressure energy
26 pressure energy
28 solid-matter adsorber and/or absorber
30 hot vapor
32 cooling water
34 volume compensator
36 vacuum pump
38 compressor
40 liquid tank
42 spring element
44 pressure container
46 concertina-type gaiter
48 end
50 end
52 perforated metal sheet
54 volume change
56 perforated metal sheet
58 end
60 lid
62 bottom
64 exterior flange
66 exterior flange
68 fan
70 heat exchanger
72 heat exchanger
74 condensed water
76 condensed water
78 mixture
80 high-pressure pump
82 high-pressure evaporator
84 heat exchanger
86 pressure water purger
88 line
90 cooling water
92 high-pressure pump
94 hot water source
96 heating unit
98 cooling water
100 condensed water
102 submarine vessel
104 exterior wall
106 submarine vessel environment
108 habitat
110 principal flow direction
112 principal flow direction
114 flow deflecting element
116 annular basket
118 axial channel
120 annular gap
122 chamber
124 annular plate 126 interior wall
128 exterior wall

The invention claimed is:

1. A method for separating off carbon dioxide from a gas mixture, in particular from breathing air, with a life-sustaining device, wherein in a first method step the gas mixture is fed to an adsorption and/or absorption unit under at least one first pressure, and in a second method step a gas mixture is conveyed out of the adsorption and/or absorption unit under at least one second pressure that is higher than the first pressure.

2. The method according to claim 1, wherein in the first method step the gas mixture is fed to the adsorption and/or absorption unit at least substantially at an ambient pressure.

3. The method according to claim 1, wherein at least one pressure container is used as an adsorption and/or absorption unit.

4. The method according to claim 1, wherein the adsorption and/or absorption unit is heated for the purpose of a pressure increase inside the adsorption and/or absorption unit.

5. The method according to claim 4, wherein the adsorption and/or absorption unit is heated by means of hot vapor.

6. The method according to claim 1, wherein at least one adsorption and/or absorption unit is heated electrically.

7. The method according to claim 1, wherein a fluid is introduced into the adsorption and/or absorption unit for the purpose of a pressure increase inside the adsorption and/or absorption unit.

8. The method according to claim 5, wherein hot vapor is introduced for the purpose of a pressure increase inside the adsorption and/or absorption unit.

9. The method according to claim 1, wherein in the first method step the gas mixture is fed to the adsorption and/or absorption unit under at least one first temperature and in the second method step the gas mixture that is to be conveyed off is conveyed out of the adsorption and/or absorption unit under at least one second temperature that is higher than the first temperature.

10. The method according to claim 1, wherein a gas is refed to the adsorption and/or absorption unit for the purpose of increasing a concentration in the adsorption and/or absorption unit.

11. The method according to claim 1, wherein carbon dioxide is conveyed out of at least one adsorption and/or absorption unit without a subsequent densification and without using a compressor.

12. The method according to claim 1, wherein in at least one adsorption and/or absorption unit at least one volume compensator is used, which is provided for ensuring a compaction of an adsorption and/or absorption material of the adsorption and/or absorption unit.

13. The method according to claim 1, wherein the gas mixture is introduced into the adsorption and/or absorption unit in a first direction and is conveyed through an adsorption and/or absorption material arranged in the adsorption and/or absorption unit in a second direction that substantially differs from the first direction.

14. The method according to claim 1, wherein heat energy is transferred from an adsorption and/or absorption unit to at least one further adsorption and/or absorption unit.

15. The method according to claim 1, wherein pressure energy is transferred from an adsorption and/or absorption unit to at least one further adsorption and/or absorption unit.

16. The method according to claim 1, wherein at least one solid-matter adsorber and/or solid-matter absorber is used.

17. The method according to claim 1, wherein at least an amine is used.

18. The method according to claim 1, wherein a recovery of air from at least one adsorption and/or absorption unit is carried out by means of at least one vacuum pump.

19. The method according to claim 1, wherein pre-densified carbon dioxide after being conveyed out of at least one adsorption and/or absorption unit is dehydrated and then subsequently densified.

20. The method according to claim 1, wherein carbon dioxide is dissolved in a liquid by means of at least one pressure water purger.

21. The method according to claim 1, wherein a residual gas pressure in at least one adsorption and/or absorption unit is discharged into a liquid tank in at least one method step.

* * * * *